W. LOYD.
Stereoscopic Instrument.
No. 26,912.
Patented Jan'y 24, 1860.
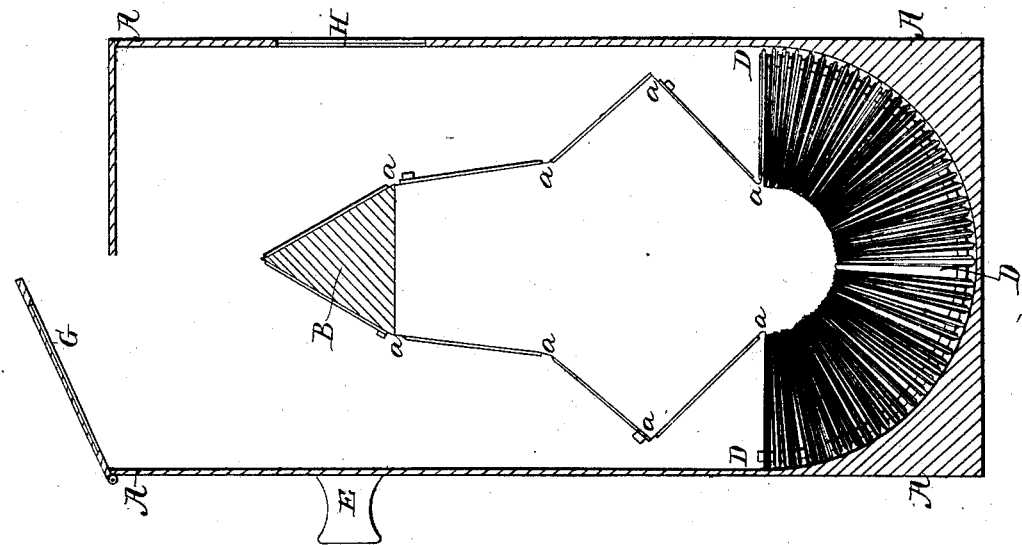
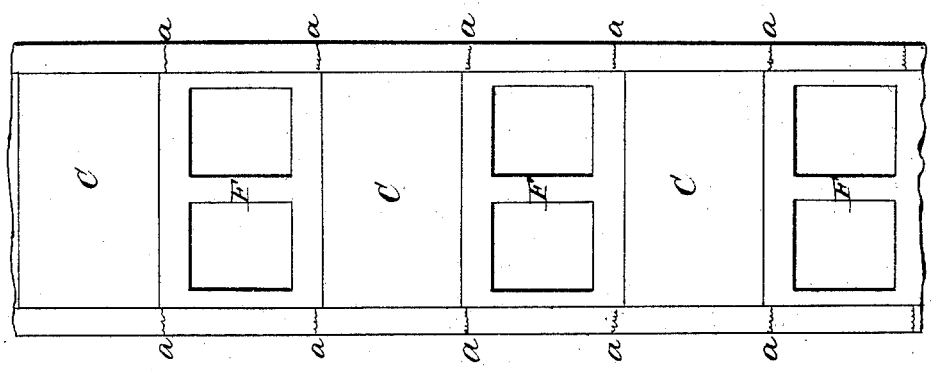
Witnesses.
Inventor
Loyd
Per Chas. F. Pinsbury
atty

UNITED STATES PATENT OFFICE.

WILLIAM LOYD, OF NEW YORK, N. Y.

STEREOSCOPIC INSTRUMENT.

Specification of Letters Patent No. 26,912, dated January 24, 1860.

*To all whom it may concern:*

Be it known that I, WILLIAM LOYD, of the city, county, and State of New York, have invented certain Improvements in Stereoscopic Instruments; and I do hereby declare the following to be a correct description of the same, reference being had to the accompanying drawings, in which—

Figure 1 is a front view of the endless belt of pictures and Fig. 2 is a vertical central section front to rear of the stereoscopic instrument.

The nature of my invention consists in the use of a belt of linen or other suitable fabric for the reception of the pictures and in the adaptation of such a belt, and of the prism on which it is supported and revolves, to the exhibition of transparent as well as of opaque pictures, as hereinafter more fully set forth.

The same letter marks the same part wherever it occurs.

The general construction of the instrument is the same as that patented by Joseph Beckel on the 25th of January, 1859, and since assigned to me.

A marks the outer case which may be of wood or metal.

B is the revolving prism which I make of glass, either solid or of three plates united at their edges.

D is the semicylindrical concave at the bottom of the box in which the mass of the pictures are folded; E, the eyeglass through which the pictures are viewed; G the reflector for throwing down light upon the face of opaque pictures; H a glass for the admission of light to transparent pictures.

C marks the position of opaque pictures in the belt; F, the open portion of the belt for the reception of transparent pictures.

*a*, *a*, &c. mark the seams forming the pockets for the reception of the ends of the pictures; 1, 1, 1, the pads or cushions on the corners of every alternate division of the belt, for the purpose of making it conform to the concave D.

I make the belt of linen or other textile fabric, or of leather, morocco, or other suitable flexible material. The edges are turned over and tacked down at proper intervals by the short seams *a*, *a*, &c. to form pockets into which the ends of the pictures are inserted. At the ends of the belt, I place strings for the purpose of attaching them together when the belt is placed in the instrument. When intended for the exhibition of opaque pictures only, the belt will require no openings, and a picture may be inserted in each of its divisions; but when it is intended for transparent pictures, it must have the openings represented at F in Fig. 1 for the admission of the transmitted light, and the pictures can be placed only in alternate divisions of the belt.

The light for the inspection of transparent pictures is admitted at H, Fig. 2, and passes through the glass prism B, to the picture, which lies upon its front face, or that nearest the eye glass E. The division of the belt on the rear face of prism B contains no picture but admits the free passage of the light through its openings.

The prism B is revolved by means of a handle or knob on the side of the case in the usual way; and its faces correspond in size with the pictures to be exhibited. It gives increased brilliancy to the transparent pictures viewed by its transmitted light.

Having thus fully described my improvements, what I claim and desire to secure by Letters Patent is—

1. The use in an instrument for the exhibition of stereoscopic pictures of a belt, formed substantially as described, of leather, linen or any suitable woven felted or laid fabric.

2. Making the prism of a stereoscopic instrument of glass or other transparent material, substantially as and for the purpose described.

The above specification signed and witnessed this 5th day of January 1860.

WILLIAM LOYD.

Witnesses:
CHAS. F. STANSBURY,
EDM. F. BROWN.